UNITED STATES PATENT OFFICE.

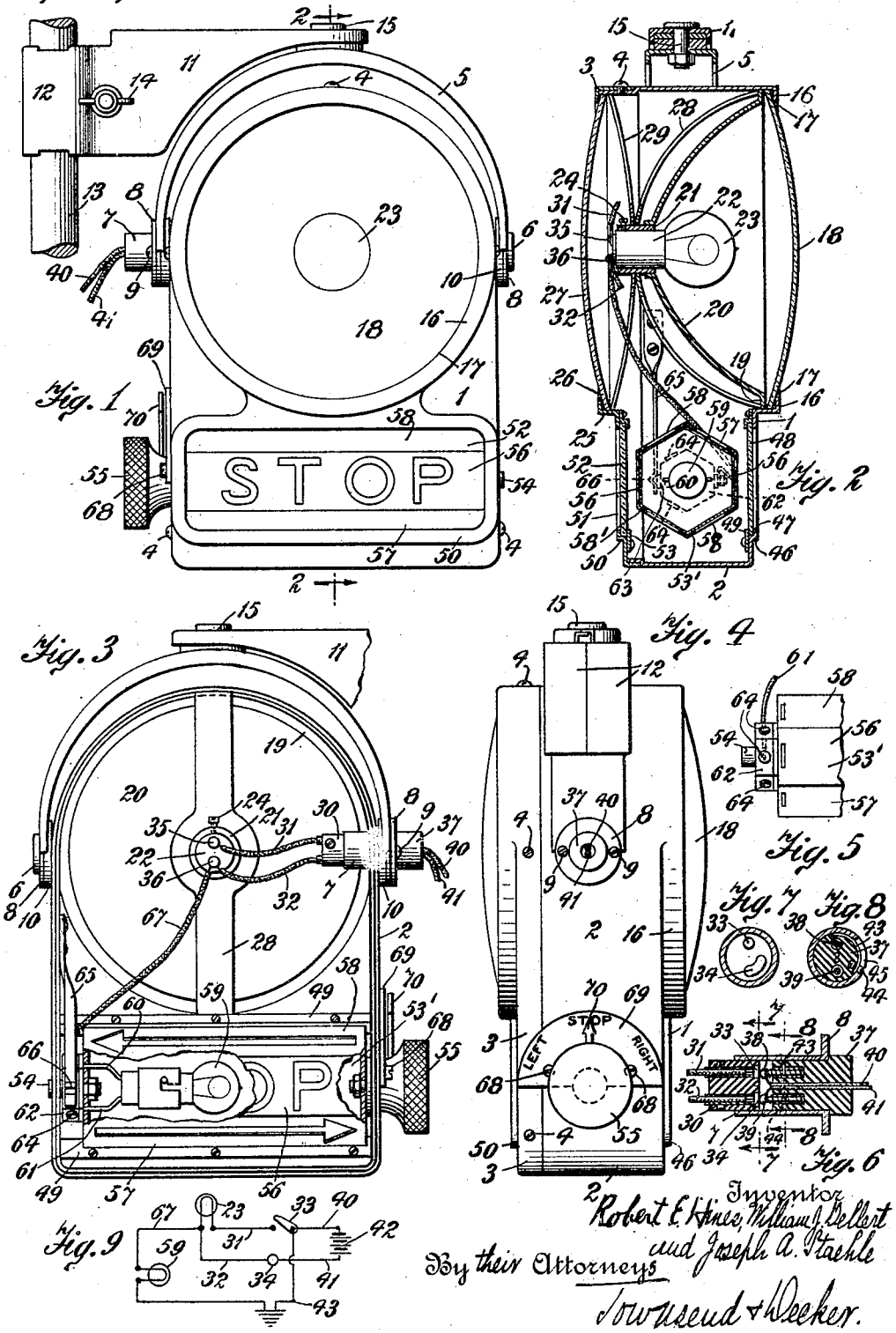

ROBERT E. HINES, WILLIAM J. DELLERT, AND JOSEPH A. STAEHLE, OF NEW YORK, N. Y.

COMBINED VEHICLE SIGNAL AND SEARCHLIGHT.

1,380,905.

Specification of Letters Patent. Patented June 7, 1921.

Application filed October 19, 1920. Serial No. 418,025.

*To all whom it may concern:*

Be it known that we, ROBERT E. HINES, WILLIAM J. DELLERT, and JOSEPH A. STAEHLE, citizens of the United States, and residents of New York, in the county of Bronx and State of New York, have invented certain new and useful Improvements in Combined Vehicle Signals and Searchlights, of which the following is a specification.

The principal object of our invention is the production of a compact device of simple and inexpensive construction which may preferably be removably attached to a vehicle and by means of which a searchlight may be operated and signals displayed by the operator or driver of the vehicle to impart information to pedestrians, or passing vehicles or others in the vicinity of the vehicle.

A further object of the invention is the production of a device having the above characteristics and in which the searchlight and lamp for illuminating the signals shall be in the same circuit with the same source of current supply, but operable independently of each other so that one may be permitted to function without affecting the other.

Our invention further contemplates the production of other distinct and novel improvements among which are the combining with the structure as above described a mirror enabling the driver of the vehicle to see behind him, the suspending or holding of the mirror and the searchlight reflector within the device in a novel manner whereby rattling is obviated, means permitting the simultaneous showing of the same signal to the rear and to the front of the vehicle and other and various advantages which will appear from the following description.

Our invention consists in the novel parts and combinations of parts hereinafter more particularly described and then specified in the claims.

In the accompanying drawing showing a practical embodiment of our invention:

Figure 1 is a front elevation of the combined vehicle signal and searchlight.

Fig. 2 is a vertical cross-section on the line 2—2 of Fig. 1.

Fig. 3 is a rear elevation of the device with the cover removed.

Fig. 4 is a side elevation thereof.

Fig. 5 is a fragmentary front elevation of the portion of the signal-lamp casing.

Fig. 6 is a horizontal section taken through the searchlight switch.

Fig. 7 is a vertical cross-section on the line 7—7 of Fig. 6.

Fig. 8 is a vertical cross-section on the line 8—8 of Fig. 6.

Fig. 9 is a diagrammatic view of the electrical connections between various of the parts.

Referring to the drawing in detail:

1 indicates the front wall of a housing, 2 the continuous side walls thereof which may be integral with said front wall and 3 a removable rear cover which is preferably detachably fastened to said side walls by suitable screws 4 as indicated. 5 indicates a bail-arm comprising a housing support one end of which is pivoted to one side of the housing by a pin 6 and the other end of which is pivoted to the other side of the housing by a metallic sleeve 7 passing through the end of said bail-arm and through a suitable opening in the side of the housing. Said metallic sleeve is provided with an annular flange 8 which may be screwed to the end of said bail-arm by screws 9 if so desired. 10 indicates rubber washers interposed between the ends of the bail-arm and the sides of the housing and which are carried respectively by the pin 6 and the metallic sleeve 7.

11 indicates the arms of a bracket terminating in jaws 12 adapted to be adapted to be clamped to or grip a frame member 13 of a windshield or other part of a vehicle. Said jaws may be held in clamped position by a screw having a winged operating head 14 as indicated and their inner ends are pivoted together and to the bail-arm 5 by a bolt and nut connection 15, whereby the housing will be suspended or extend transversely outwardly from the vehicle.

The front wall of the housing is provided with an offset or shouldered portion 16 having an enlarged annular opening 17. Said offset portion receives a lens 18 which extends through the opening 17 and it also receives the outer annular edge 19 of a reflector 20. Said reflector is provided at its inner central portion with a cylindrical bearing 21 receiving the lamp socket 22 of a searchlight 23. Said socket is capable of horizontal movement in said bearing 21 to effect focal adjustment of the searchlight, and it may be held in any desired adjusted position by a set-screw 24 passing through the bearing 21 and adapted to engage the socket.

The rear removable cover 3 is likewise provided with a shouldered or offset portion 25 having an enlarged annular opening 26, which shouldered portion receives therein an annular mirror 27 for the usual purpose facing rearwardly and protruding through the opening 26. 28, 29 indicate springs perforated at their central enlarged portions to receive and be supported by the bearing 21 of the reflector so that the springs are loosely mounted on said bearing and are capable of a sliding movement thereon. When the parts are in the proper mounted position and the cover 3 is in place the central enlarged portions of the springs engage each other as shown in Fig. 2, the ends of the spring 28 engage and press against the edge 19 of the reflector and the ends of the spring 29 engage and press against the inner edge of the mirror. Thus the reflector and mirror are firmly held in position by said springs 28 and 29 and are capable of slight horizontal forward and rearward movement against the action of said springs when the vehicle is subjected to abnormal jolts. This construction, as is manifest, obviates rattling which would obtain if it were endeavored to rigidly mount the parts in their respective positions as rigid connections would become loosened through constant jarring and jolting of the vehicle.

30 indicates the body member of the search-light switch which is constructed of an insulating material and which is mounted in the metallic sleeve 7. 31, 32 are conducting wires mounted in said body member and extending therethrough and connecting on the inner end thereof with the contacts 33, 34, respectively, the contact 34 being somewhat elongated as illustrated in Fig. 7. The conducting wires 31, 32 are also connected respectively with the binding posts 35, 36 of the searchlight and which are mounted on the rear of the socket 22.

The plug member of the searchlight switch is indicated at 37. Said plug is constructed of an insulating material and is rotatably supported in said metallic sleeve 7. Spring-pressed contact pins 38, 39 are mounted in the inner end of said plug member and are connected with the conducting wires 40, 41, respectively, which extend through said plug and which are connected with a battery or other suitable source of current supply indicated diagrammatically in Fig. 9 at 42. A ground wire 43 adapted to at all times engage the inner surface of the metallic sleeve 7 (Fig. 8) is held in a groove in the plug member 37. One end of the ground wire is connected with the contact pin 38 while the other end is connected to a screw-threaded pin 44 carried by the plug member and the end of which is received by a slot 45 with which the metallic sleeve 7 is provided. The pin 44 and slot 45 obviously limit the movement of rotation of the plug member 37 within the metallic sleeve. The plug may be rotated or turned to make or break the electrical connection between the contact 33 and pin 38 but irrespective of the amount of rotation of said plug, engagement is always maintained between the contact 34 and pin 39 due to the elongated character of said contact and to the length of the groove 45 within which the pin 44 slides and which acts as a stop for said pin.

The front wall of the housing is provided with an offset 46 having a rectangular opening 47 within which offset a green glass 48 is seated and which may be held in position by retaining plates 49 fastened to the inner side of said front wall. Likewise the rear wall of housing is provided with an offset 50 having a rectangular opening 51 within which offset a red glass 52 is seated and which is held in position by retaining plates 53 fastened to said rear wall.

A rotatable hexagonal signal casing 53' is mounted in the lower portion of the housing and is fastened to a pivot 54 extending through one side wall of the housing and to the shank of an insulating operating knob 55 which shank extends through the other side wall of said housing as indicated in Fig. 3. Two of the opposite sides or walls 56 of said casing have letters cut therein forming the word "Stop," two other opposite sides 57 have an arrow cut therein pointing in one direction and the remaining pair of opposite sides 58 have an arrow cut therein pointing in the other direction. The inner sides of the walls of said casing are preferably covered with paper or other translucent material 58 so that light will be diffused through the translucent material where the indicia appear to make said indicia discernible, said translucent material acting at the same time to prevent the contents of the casing from being exposed to view.

A lamp 59 extends longitudinally within said casing 53' and is held in position therein by the rods 60, 61 which also act as the conductors for said lamp. Said rods extend through openings in the end wall of said casing and into a hexagonal "commutator" 62 constructed of an insulating material which is rigidly mounted on the pivot 54 intermediate the side wall of the housing and the end wall of the casing. The rod 60 is connected with a binding post 63 on a side of the commutator 62 while the rod 61 is connected to each of the three contacts 64 on other sides of the commutator. 65 indicates a spring circuit making and breaking strip provided with a shoulder 66. Said strip is fastened to the side wall of the housing and the shoulder 66 is adapted to engage either of the three contacts 64. A conducting wire 67 connects the binding post 36 of the socket of the searchlight and the binding post 63 on the commutator.

Fastened to the side wall of the housing adjacent the operating knob 55 by screws 68 is an indicator plate or dial 69 bearing the words "Left," "Stop" and "Right." An arrow 70 carried by the operating knob 55 is adapted to register with the words on said indicator plate. As is obvious, a rotation of the operating knob 55 effects a rotation of the signal casing within the housing, the movement of rotation being limited by the heads of the screws 68 which are adapted to be engaged by the arrow 70 and which act as stops therefor.

When the driver of the vehicle desires to display a signal to indicate his intention to pedestrians or persons in vehicles either in front of or to the rear of the vehicle he simply rotates the operating knob 55 until the arrow 70 is in alinement with words "Left," "Stop" or "Right" appearing on the indicator plate or dial 69. This simultaneously energizes the lamp 59 and displays the same signal both through the green glass 48 in the front of the housing and the red glass 52 in the rear of the housing. If he then desires to display this signal to a person at the side of the vehicle or at right-angles thereto such as a traffic policeman, he may swivel the housing around bodily on the pivot or bolt 15. The bringing of the arrow 70 into alinement with the word "Stop" on the indicator plate 69 rotates the casing 53′ so that the sides thereof having this same word cut therein are brought into alinement with the green and red glasses 48 and 52 respectively. This simultaneously brings the shoulder 66 of the spring strip 65 into engagement with one of the contacts 64 on the commutator 62 to energize the lamp 59, the circuit being from the source of current 42, through the conducting wire 40, to contact pin 38, through ground wire 43, to ground (the housing), through spring strip 65, contact 64, rod 61, through lamp 59, rod 60, conducting wire 67, conducting wire 32, contact 34, contact pin 39, conducting wire 41 and back to the source of current.

When the operating knob 55 is turned to a position whereby the arrow 70 is intermediate one of the words on the indicator or dial 69, the lamp 59 is deënergized and no signal appears as the shoulder 66 is free from engagement with one of the contacts 64 and merely engages the insulating body of the commutator 62 or one of the corners or edges of the meeting sides thereof to break the circuit. When the arrow 70 is in alinement with the word "Left" on the indicator the arrows on the casing pointing to the left are shown simultaneously through the red and green glasses and the lamp 59 is energized in the manner described. Likewise the bringing of the arrow 70 into alinement with the word "Right" on the indicator simultaneously displays the arrows pointing to the right on the casing through the red and green glasses. It will thus be seen that a simple manipulation of the operating knob 55 prominently and simultaneously displays the same signal at the front of and at the rear of the device to indicate to others the intentions of the driver, that is whether he intends to stop or whether he intends to turn to the right or to the left as indicated by the direction of the arrow displayed.

While the current as has been explained must flow through the searchlight switch when the lamp 59 is energized, the peculiar construction of this switch permits the searchlight 23 to be energized as well and either the lamp or searchlight to be energized simultaneously or each independently of the other. To energize the searchlight the plug member 37 is rotated to bring the contact pin 38 into engagement with the contact 33. The circuit is then from the source of current 42 through the conducting wire 40, contact pin 38, contact 33, conducting wire 31, the searchlight, conducting wire 32, contact 34, contact pin 39, conducting wire 41 and to the source of current. When the searchlight is energized the direction of the rays therefrom may be varied by swinging the housing on its horizontal pivots in the desired direction and by swiveling the housing on the vertical pivot or bolt 15.

What we claim as our invention is:—

1. In a device of the character described, a housing provided with openings therein, a searchlight mounted in said housing and connected to a source of current supply, a rotatable casing mounted within said housing and having signals thereon, an insulating commutator connected to said casing and provided with contacts thereon connected to said source of current supply, a lamp within said casing provided with rigid conductors fastened to said insulating commutator, one of said conductors being connected to said contacts and the other to the source of current supply, a circuit making and breaking device engaging said commutator and connected to the source of current supply and means for rotating said casing to energize said lamp and to simultaneously display a signal on said casing through an opening in said housing.

2. In a device of the character described, a housing, a reflector mounted in said housing and provided with a bearing, a searchlight, a socket therefor slidably mounted in said bearing, means for holding said socket in said bearing in the desired position, a mirror mounted in said housing and spring means loosely carried by said bearing and engaging said reflector and mirror and holding the same in mounted position while permitting a movement of said reflector and mirror under abnormal conditions.

3. In a device of the character described, a housing, a searchlight mounted in said housing, a rotatable casing having signals thereon pivotally mounted in said housing, a lamp within said casing, means for rotating said casing to display the signals and to simultaneously energize said lamp and a switch electrically connected with said searchlight and said lamp for energizing said searchlight and adapted to permit said lamp to be energized independently of said searchlight upon rotation of said casing and to maintain the connection to and through said lamp.

4. In a device of the character described, a housing, a searchlight mounted in said housing, rotatable means for displaying signals mounted in said housing, a lamp within said means electrically connected with said searchlight and said housing and a switch electrically connected with said searchlight and said housing for energizing said searchlight and adapted to permit said lamp to be energized independently of said searchlight upon rotation of said rotatable means and to maintain the connection to and through said lamp.

5. In a device of the character described, a housing connected with a source of current supply, a searchlight mounted in said housing a rotatable casing within said housing having signals thereon, an insulating commutator carried by said casing and having contacts thereon, a lamp within said casing having one terminal thereof connected to said contacts and the other terminal connected to one of the terminals of said searchlight, a strip connected to said housing and adapted to engage the contacts on said commutator, and a two-part switch having one member thereof connected provided with contacts electrically with the terminals of said searchlight and the other member comprising a plug having contact pins connected with said source of current supply and one of which engages one of the contacts of said first member of said switch and the other of which is connected to said housing and is adapted to engage the other of the contacts of said first member of said switch.

6. In a device of the character described, a housing connected with a source of current supply, a searchlight mounted in said housing, a rotatable casing within said housing having signals thereon, an insulating commutator carried by said casing and having contacts thereon, a lamp within said casing having one terminal thereof connected to said contacts and the other terminal connected to one of the terminals of said searchlight, a strip connected to said housing and adapted to engage the contacts on said commutator, a two-part switch having one member thereof provided with contacts electrically connected with the terminals of said searchlight and the other member comprising a rotatable plug having contact pins connected with said source of current supply and one of which engages one of the contacts of said first member of said switch and the other of which is connected to said housing and is adapted to engage the other of the contacts of said first member of said switch upon rotation of said plug to energize the searchlight and means for rotating said casing to simultaneously display the signals thereon and to cause said strip to engage one of the commutator contacts to energize the lamp independently of said searchlight.

Signed at New York, in the county of New York and State of New York, this 18th day of October, A. D. 1920.

ROBERT E. HINES.
WILLIAM J. DELLERT.
JOSEPH A. STAEHLE.

Witnesses:
F. B. TOWNSEND,
GEORGE E. BROWN.